Dec. 22, 1931.  J. F. O'CONNOR  1,837,477
HAND BRAKE
Filed July 14, 1930
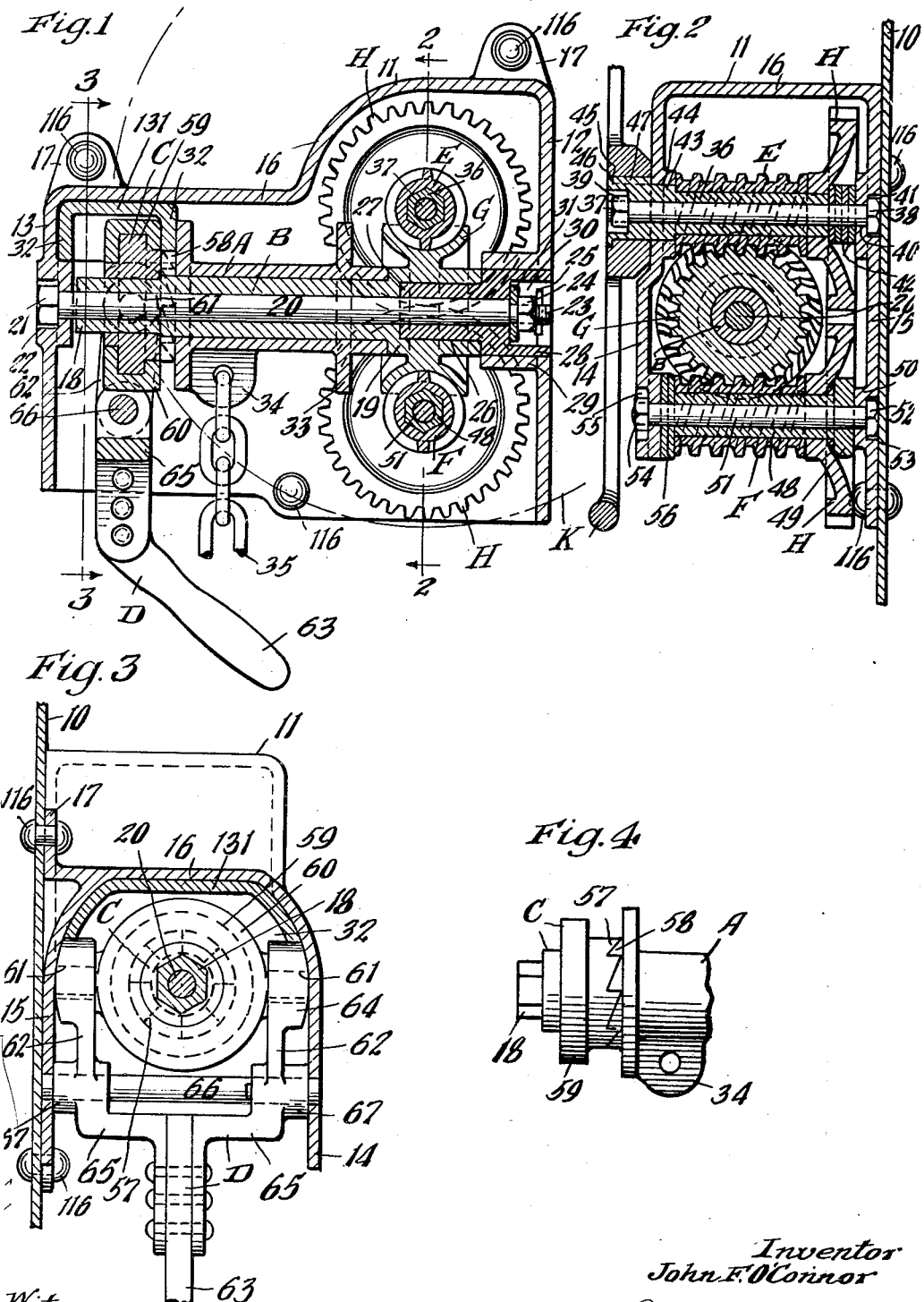
Witness
Wm. Geiger
Inventor
John F. O'Connor
By Joseph Harris
His Atty.

Patented Dec. 22, 1931

1,837,477

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

HAND BRAKE

Application filed July 14, 1930. Serial No. 467,826.

This invention relates to improvements in hand brakes.

One object of the invention is to provide a simple and efficient hand brake mechanism especially adapted for railway cars, of the worm gear operated type, wherein the wear between the relatively moving parts is greatly reduced by providing a plurality of interconnected driving worm members cooperating with the worm wheel associated with the usual chain winding drum, the end thrust on each of the worm members being thus materially reduced in addition to the reduction in wear between the cooperating threads of the worm and worm gear.

Another object of the invention is to provide a hand brake mechanism of the worm gear operated type including a chain winding drum, wherein free running of the chain winding drum in releasing the brakes is obtained by means of a simple and efficient clutch mechanism connecting the chain winding drum and worm gearing.

Other objects of the invention will more clearly appear from the description and claims hereinafter following.

In the drawings, forming a part of this specification, Figure 1 is a vertical sectional view of my improved hand brake mechanism, corresponding to a plane parallel with the end wall of a railway car and illustrating the same mounted on said end wall. Figure 2 is a vertical, transverse sectional view corresponding substantially to the line 2—2 of Figure 1. Figure 3 is a view similar to Figure 2, taken on the line 3—3 of Figure 1. And Figure 4 is a detailed view of the improved clutch mechanism, partly broken away.

In said drawings, 10 designates the end wall of a railway car on which my improved hand brake mechanism is mounted. As shown in the drawings, the improved hand brake mechanism is preferably mounted within a housing 11, which has spaced side walls 12 and 13, spaced front and rear walls 14 and 15 and a top wall 16. The housing is open at the bottom, as most clearly shown in Figures 1, 2 and 3, and is secured to the end wall 10 of the car by means of rivets 116—116 extending through securing ears 17—17 projecting from the top of the housing. As shown in Figure 1, the right hand end portion of the housing is of greater height than the left hand portion so as to accommodate the gear members.

My improved hand brake mechanism proper comprises broadly a chain winding drum A; a drive shaft B; a clutch element C; a clutch shipper lever D; worm members E and F; a worm wheel G; gears H and H; and a hand wheel K.

The drive shaft B is in the form of a sleeve member having a reduced portion 18 of square cross section at the left hand end thereof, as viewed in Figure 1. At the right hand end, as viewed in said figure, the shaft or sleeve B is enlarged, as indicated at 19, and has the worm wheel member G formed integral therewith. Between the square section 18 and the enlarged portion 19, the shaft B is of substantially cylindrical cross section. The shaft or sleeve B is supported for rotation within the housing upon a cylindrical bar or rod 20 having a bolt head 21 at one end thereof seated in a pocket 22 provided in the side wall 13 of the housing. At the opposite end, the cylindrical bar 20 is reduced in diameter, as indicated at 23, the extremity of the reduced portion being screw threaded and receiving a retaining nut 24. The retaining nut is preferably locked to the bar 20 by means of a cotter pin 25 extending through the threaded portion of said bar. At the right hand end of the sleeve B is provided with an enlarged opening 26 receiving the cylindrical reduced end 27 of a thimble member 28 mounted in a hollow boss 29 projecting inwardly from the side wall 12 of the housing. The retaining or supporting bar 20 extends through the thimble and the nut of said bar is accommodated within a pocket 30 in the enlarged part of said thimble. A shim or washer 31 is preferably interposed between the nut 24 and the bottom of the pocket 30. As will be evident, the drive shaft or sleeve B is thus rotatably supported on the bar 20, and also rotatably supported by the thimble 28.

The chain winding drum A is of substantially cylindrical form and is rotatably supported on the cylindrical portion of the drive shaft B. At the left hand end, as viewed in Figure 1, the drum A is provided with an annular flange which bears on a spacing member 131 interposed between said flange and the side wall 13 of the housing. The spacing member 131 is preferably shaped so as to fit the top and upper end wall portions of the housing and has a horizontal section provided with depending flange portions 32—32 at opposite edges thereof, which bear respectively on the wall 13 and the flange at the corresponding end of the drum A. The opposite end of the drum bears on the enlarged portion of the shaft B, which forms the worm wheel G, and inwardly of said end is provided with an annular flange 33 serving as a chain guide. The cylindrical portion of the winding drum has an outstanding ear 34 to which the brake chain 35 is connected, the opposite end of the chain being connected with the brake mechanism proper of the car, not shown.

The worm members E and F are of similar design and are disposed transversely of the drive shaft B. The worm member E, which is disposed above the worm wheel and meshes therewith, is mounted on a sleeve 36 of hexagonal cross section, which sleeve carries one of the gear members H at the inner end thereof. As will be evident, the worm E and the gear member H referred to, are thus mounted for rotation in unison with the sleeve 36. The sleeve 36 is supported on a bar or rod 37 headed at the inner end, as indicated at 38, and provided with a nut 39 at the outer end thereof. The inner end of the rod 37 is supported in an opening 40 in the end wall 15 of the housing and the head 38 is accommodated within a pocket 41. The rod extends entirely through the sleeve 36 and a plurality of spacing shims or washers 42—42 are interposed between the inner end of the sleeve 36 and the back wall 15 of the housing. At the outer end, the sleeve 36 projects through the front wall 14 of the housing, said end portion of the sleeve being enlarged, as indicated at 43, and of cylindrical cross section. The portion 43 of the sleeve 36 is journaled in an opening 44 in said front wall of the housing, which opening is reinforced, as shown. At the extremity, the enlarged portion 43 is provided with an outstanding lateral annular rib 45 for a purpose hereinafter pointed out.

The hand wheel K, which is mounted on the outer end of the sleeve 36, is provided with a cylindrical opening accommodating the enlarged portion 43 of the sleeve 36 and is also provided with an annular groove or seat 46 at the outer end of the opening, which receives the rib 45 of the sleeve, thereby retaining the hand wheel in assembled relation with the operating sleeve. In order to lock the hand wheel K to the sleeve the section 43 of the latter is provided with an outstanding rib 47 forming a key member engaging in a key slot provided in the upper section of the hand wheel.

The worm member F, which is disposed below the worm whel G and diametrically opposite to the worm E, is also mounted on a hollow sleeve member 48 similar to the sleeve member 36, hereinbefore described. The sleeve member 48 is of hexagonal cross section and engages within similar openings provided in the worm member F and the gear member H associated therewith. At the right hand end, as viewed in Figure 2, the sleeve 48 is enlarged, as indicated at 49, said enlarged portion bearing directly on a hollow boss 50 projecting inwardly from the wall 15. The sleeve 48 is rotatably supported on a cylindrical bar 51, which has a bolt head 52 at the inner end thereof seated in a pocket 53 provided in the end wall 15 of the housing. The bar extends through both the front and rear walls of the housing and the sleeve 48, and is retained in assembled relation with the housing by means of a securing nut 54 at the outer end thereof seated within a pocket 55 provided in the front wall 14 of the housing. Spacing shims or washers 56—56 are preferably interposed between the front wall of the housing and the outer ends of the sleeve 48 and worm F.

The clutch element C is in the form of a sleeve slidably mounted on the hexagonal end portion 18 of the operating shaft B. As will be evident, the clutch element is thus mounted for sliding movement on the shaft and for rotation in unison therewith. At the inner end, as viewed in Figures 1 and 4, the clutch element C is provided with clutch teeth 57 which cooperate with a set of clutch teeth 58 formed integral with the annular flange at the corresponding end of the chain winding drum A. Between the ends the clutch element or sleeve is provided with an annular rib 59, which is accommodated within a groove of a ring member 60. The ring member 60 is provided with outstanding trunnions 61—61 at opposite sides thereof.

The shipper lever D comprises a fork member 62 and a handle portion 63. The forked section 62 is composed of two separate members, each having an inwardly extending arm 64 connected to the corresponding trunnion 61 of the ring 60, and an inwardly projecting right angular portion 65 secured to the operating arm 63. The shipper lever is pivotally supported in the front and rear walls of the housing by means of a pivot shaft 66 extending through journal portions 67—67 formed on the parts of the fork member of the shipper lever.

In assembling my improved hand brake mechanism within the housing, the worm E and the corresponding gear H together with the shims 42—42 are first entered within the housing and the securing and supporting bar or rod 37 is then inserted through the rear wall of the housing. The hand wheel K with the sleeve 36 secured thereto is then applied to the housing by entering the sleeve through the opening 44 in the front wall 14 and inserting the hexagonal section thereof within the worm E and the gear H. These parts are then secured by applying the nut to the bar 37. The sleeve B with the chain winding drum A and clutch member C assembled therewith are then entered within the housing and the thimble 28 applied to the opening in the side wall 12 of the housing. These parts are then secured in assembled position by the retaining and supporting rod 20 by entering the rod through the opening in the wall 13 of the housing. After the parts have been thus far assembled, the retaining nut 25 is applied to the rod 20. The sleeve 48 with the worm F and the corresponding gear H thereon is then inserted through the bottom of the housing and supported in operative position by a retaining and supporting rod 51.

In a chain tightening operation, the hand wheel K is rotated in a clockwise direction, as viewed in Figure 1, thereby rotating the worm E in a similar direction. Inasmuch as the gear members H—H are in mesh, the worm member F below the worm wheel G will also be rotated at this time but in a direction reverse to the direction of rotation of the worm E. As both the worm members E and F are in mesh with the worm wheel G, the latter will be rotated thereby, the load being distributed between the two worm members. Rotation of the worm wheel G effects rotation of the sleeve B and the clutch element C. Inasmuch as the clutch element C is at this time in clutching engagement with the clutch means of the chain winding drum A, the latter will be rotated therewith and the chain wound on the same. As will be evident, backward rotation of the hand wheel due to the pull of the brake chain during the chain tightening operation, is prevented due to the enormous friction existing between the cooperating threads of the worm gear and worm elements.

To release the brakes, the shipper lever D is swung to the left, as viewed in Figure 1, thereby disengaging the clutch element C from the cooperating clutch means of the chain winding drum A and permitting free rotation of the latter. When the brakes have been fully released, the clutch member will be returned to clutching engagement through the action of gravity on the shipper lever member. If for any reason the clutch fails to automatically reengage after release of the brakes, the same may be positively shifted by means of the lever D so as to effect re-engagement thereof.

When it is desired to back up or ease off the brakes, the clutch element C is left in engaged relation with the clutch means of the chain winding drum A and the brakeman turns the hand wheel K in a contra-clockwise direction, as viewed in Figure 1, thereby permitting rotation of the chain winding drum in unwinding direction.

From the preceding description taken in connection with the drawings, it will be evident that I have provided an exceedingly simple and efficient worm gear actuated brake mechanism wherein the wear of the parts is greatly reduced, thus adding to the life of the mechanism. Due to the provision of two worm elements at opposite sides of the worm gear, the thrust on each worm member is reduced fifty per cent, due to the load being equally distributed between these two members. This not only reduces the end thrust on the bearings of the worm elements, but also greatly reduces the wear on the cooperating threads of the individual worm elements and the worm gear.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotatable supporting shaft having one end enlarged and forming a worm wheel; of a chain winding drum rotatable on said shaft and having one end abutting said worm wheel; said drum having clutch teeth at the other end; a pair of worm members disposed on diametrically opposite sides of said worm wheel and meshing therewith; gear elements operatively connecting said worm members; manually actuated rotary means for operating one of said worm members; a releasable clutch member rotatable with said shaft and slidable thereon, said clutch member having teeth engageable with the drum teeth; and means for reciprocating said clutch member on said shaft to engage the same with or disengage the same from the teeth of the drum.

2. In a hand brake mechanism, the combination with a housing having opposed walls; of horizontally disposed supporting means anchored in said opposed walls and spanning the space therebetween; a tubular drive shaft journaled on said supporting means and held against endwise movement thereon, said shaft having an annular abutment shoulder adjacent to one end; a chain winding drum journaled on said shaft, one end of said drum abutting the annular shoulder of the shaft; a spacer member carried by the housing and engaging the opposite end of the drum to hold the same against endwise movement on the shaft; manually actuated means for rotating said shaft; sliding clutch means on said shaft cooperating with said drum and rotatable with the shaft; and means for reciprocating said clutch means.

3. In a hand brake mechanism, the combination with a housing having opposed walls; of a supporting thimble journaled in one of said walls, said thimble having an abutment shoulder; a supporting member anchored to said thimble and the other of said opposed walls; a sleeve rotatable on said supporting member, said sleeve having a bearing section telescoped over the thimble and having its opposite ends engaging said abutment shoulder of the thimble and the opposite side wall of the housing; a chain winding drum rotatable on said sleeve; a clutch element slidable on said sleeve and rotatable therewith; cooperating clutch means on the drum; and means for reciprocating said clutch element.

In witness that I claim the foregoing I have hereunto subscribed my name this 10th day of July 1930.

JOHN F. O'CONNOR.